United States Patent
Loaiza et al.

(10) Patent No.: US 9,063,908 B2
(45) Date of Patent: Jun. 23, 2015

(54) RAPID RECOVERY FROM LOSS OF STORAGE DEVICE CACHE

(75) Inventors: Juan R. Loaiza, Woodside, CA (US); Kothanda Umamageswaran, Sunnyvale, CA (US); Boris Erlikhman, Mountain View, CA (US); David Friedman, New York, NY (US); Jia Shi, Burlingame, CA (US); Zuoyu Tao, Belmont, CA (US); Alex Tsukerman, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 31 days.

(21) Appl. No.: 13/485,557

(22) Filed: May 31, 2012

(65) Prior Publication Data

US 2013/0326152 A1    Dec. 5, 2013

(51) Int. Cl.
| | |
|---|---|
| *G06F 12/00* | (2006.01) |
| *G06F 11/20* | (2006.01) |
| *G06F 3/06* | (2006.01) |
| *G06F 12/08* | (2006.01) |

(52) U.S. Cl.
CPC .......... *G06F 11/2082* (2013.01); *G06F 3/0629* (2013.01); *G06F 12/00* (2013.01); *G06F 12/08* (2013.01); *G06F 12/0802* (2013.01)

(58) Field of Classification Search
USPC ................ 711/141, 100, 113, 143, 154, 138, 711/E12.02
See application file for complete search history.

(56) References Cited

U.S. PATENT DOCUMENTS

| | | | |
|---|---|---|---|
| 4,425,615 | A | 1/1984 | Swenson et al. |
| 5,717,893 | A | 2/1998 | Mattson |
| 6,457,105 | B1 | 9/2002 | Spencer et al. |
| 6,526,483 | B1 | 2/2003 | Cho et al. |
| 6,728,823 | B1 | 4/2004 | Walker et al. |
| 6,922,754 | B2 | 7/2005 | Liu et al. |
| 7,069,324 | B1 | 6/2006 | Tiwana et al. |
| 7,159,076 | B2 | 1/2007 | Madter |
| 7,165,144 | B2 | 1/2007 | Choubal et al. |
| 7,290,090 | B2 | 10/2007 | Madter |
| 7,461,147 | B1 | 12/2008 | Mowat et al. |
| 7,506,103 | B2 | 3/2009 | Madter |
| 7,636,814 | B1 | 12/2009 | Karr et al. |
| 7,836,262 | B2 | 11/2010 | Gunna et al. |
| 7,904,562 | B2 | 3/2011 | Takase et al. |
| 8,244,984 | B1 | 8/2012 | Glasco et al. |
| 8,359,429 | B1 * | 1/2013 | Sharma et al. ................ 711/111 |
| 8,370,452 | B2 | 2/2013 | Harvell et al. |
| 2004/0117441 | A1 | 6/2004 | Liu et al. |

(Continued)

FOREIGN PATENT DOCUMENTS

| | | |
|---|---|---|
| GB | 2409 301 A | 6/2005 |
| WO | WO 93/18461 | 9/1993 |

*Primary Examiner* — Midys Rojas
(74) *Attorney, Agent, or Firm* — Hickman Palermo Becker Bingham LLP (57) ABSTRACT

Dirty data in a storage device is made current through rapid re-silvering, which uses a mirrored and up-to-date version of the dirty data from another storage device to recover the data. Because under rapid re-silvering cache metadata in volatile memory survives the failure of the cache, the cache metadata is used to determine which subset of data from the other storage device needs to be copied to the storage device being re-silvered. During re-silvering, cache metadata is used to determine which I/O requests from clients are requests for data that is not stale.

20 Claims, 4 Drawing Sheets

(56) References Cited

U.S. PATENT DOCUMENTS

| | | |
|---|---|---|
| 2004/0148486 A1 | 7/2004 | Burton |
| 2004/0225845 A1 | 11/2004 | Kruckemyer et al. |
| 2004/0254943 A1 | 12/2004 | Malcolm |
| 2005/0160224 A1 | 7/2005 | Cuomo et al. |
| 2005/0193160 A1 | 9/2005 | Bhatt et al. |
| 2005/0210202 A1 | 9/2005 | Choubal et al. |
| 2006/0064441 A1 | 3/2006 | Yamamoto |
| 2006/0106890 A1 | 5/2006 | Paul et al. |
| 2006/0218123 A1 | 9/2006 | Chowdhuri et al. |
| 2007/0067575 A1 | 3/2007 | Morris et al. |
| 2007/0260819 A1 | 11/2007 | Gao et al. |
| 2008/0016283 A1 | 1/2008 | Madter |
| 2008/0046736 A1 | 2/2008 | Arimilli et al. |
| 2008/0104329 A1 | 5/2008 | Gaither et al. |
| 2009/0193189 A1 | 7/2009 | Carswell et al. |
| 2009/0248871 A1 | 10/2009 | Takase et al. |
| 2010/0017556 A1 | 1/2010 | Chin et al. |
| 2011/0022801 A1 | 1/2011 | Flynn |
| 2011/0173325 A1 | 7/2011 | Cherian et al. |
| 2011/0258376 A1 | 10/2011 | Young |
| 2013/0086330 A1 | 4/2013 | Baddepudi et al. |
| 2014/0281272 A1 | 9/2014 | Loaiza et al. |
| 2015/0006813 A1 | 1/2015 | Goyal et al. |

\* cited by examiner

RAPID RECOVERY FROM LOSS OF STORAGE DEVICE CACHE

CROSS-REFERENCE TO RELATED APPLICATIONS; BENEFIT CLAIM

This application is related to U.S. application Ser. No. 13/288,785, entitled Write-Back Storage Cache Based On Fast Persistent Memory, filed on Nov. 3, 2011 by Bharat Chandra Baddepudi, et al., the contents of which are incorporated herein by reference.

This application is related to application Ser. No. 12/631,985, Caching Data Between A Database Server And a Storage System, filed by Kiran Badrinarain Goyal, et al., on Dec. 7, 2009, the contents of which are incorporated by reference.

This application is related to application Ser. No. 12/691,146, Selectively Reading Data From Cache And Primary Storage, filed by Kothanda Umamageswaran, et al., on Jan. 21, 2010, the contents of which are incorporated by reference.

FIELD OF THE INVENTION

The present invention relates data storage devices.

BACKGROUND

In storage management, data is stored in storage devices. Storage devices may use two (or more) different types of storage to store and provide access to data, which are primary storage and cache. Primary storage is where data is primarily and persistently stored, and cache is where data is stored to provide quick access to data. The cache stores less data than primary storage and is often comprised of more expensive and more quickly accessed memory than that used for primary storage. For example, cache may be volatile memory or non-volatile flash memory and the primary storage may be disk-based storage.

To ensure availability of data on a storage device when that storage device fails or otherwise becomes unavailable, storage management systems use data mirroring. In data mirroring, data stored on a storage device is stored redundantly on one or more other storage devices. Data mirroring ensures that when mirrored data on a storage device becomes unavailable on that storage device, a redundantly stored copy may be obtained from another storage device.

When a storage device becomes unavailable, it is advantageous to bring the storage device back on-line quickly. A complication of bringing the storage device on-line is that mirrored data on primary storage of the storage device may be stale because the mirrored data does not reflect updates that were made recently or made after the unavailability. When bringing the storage device back on-line, a current version of the mirrored data may be used to update respective data on the storage device.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Re-silvering is an operation that makes stale data stored in a storage device current by applying a current copy of data stored another storage device. It is advantageous to perform re-silvering in a way that is efficient and that hastens the availability of data stored on the storage device. Described herein are mechanisms for performing re-silvering efficiently while concurrently allowing availability to data stored in the storage device. These approaches are referred to herein rapid re-silvering.

As described herein, rapid re-silvering is based on storage devices capable of operating in a mode referred to herein as "write-back mode". In write-back mode, a storage device responds to an I/O request from a storage device client to write data by persistently writing the data to a non-volatile cache and acknowledging to the requestor that the data is written persistently in the storage device. The acknowledgement is sent without necessarily having written the data that was requested to be written to primary storage. Instead, the data may be written to primary storage later.

Because the data that was written to cache may be written to primary storage later, there is a period of time during which the cached data is different than the version of the data stored in primary storage. A cache copy of data that has been changed in response to a storage device client request to do so before the changed cache copy is stored to primary storage is referred to herein as dirty. The corresponding data in primary storage is referred to as stale.

A storage device maintains and uses cache metadata to specify which data in primary storage has a copy in cache and which of the cache copies are dirty. The cache metadata is stored in volatile memory so that it may be quickly accessed to determine whether requested data is cached or not. A copy of the cache metadata may also be stored in the non-volatile cache.

It is possible a cache may fail and the data stored therein is lost. For dirty data in the cache at the time of failure, the current and valid version of the data is lost within the storage device. All that remains in the storage device is the stale version in primary storage.

As described herein, stale data is made current through rapid re-silvering, which uses a mirrored and up-to-date version of the data from another storage device to recover the data. Because under rapid re-silvering cache metadata in volatile memory survives the failure of the cache, the cache metadata is used to determine which subset of data from the other storage device needs to be copied to the storage device being re-silvered. Without information identifying the subset, all the data in the primary storage subject to write-back mode might need to be updated with mirrored versions stored on other the storage device.

Illustrative Mirrored Storage System

Figure 1:
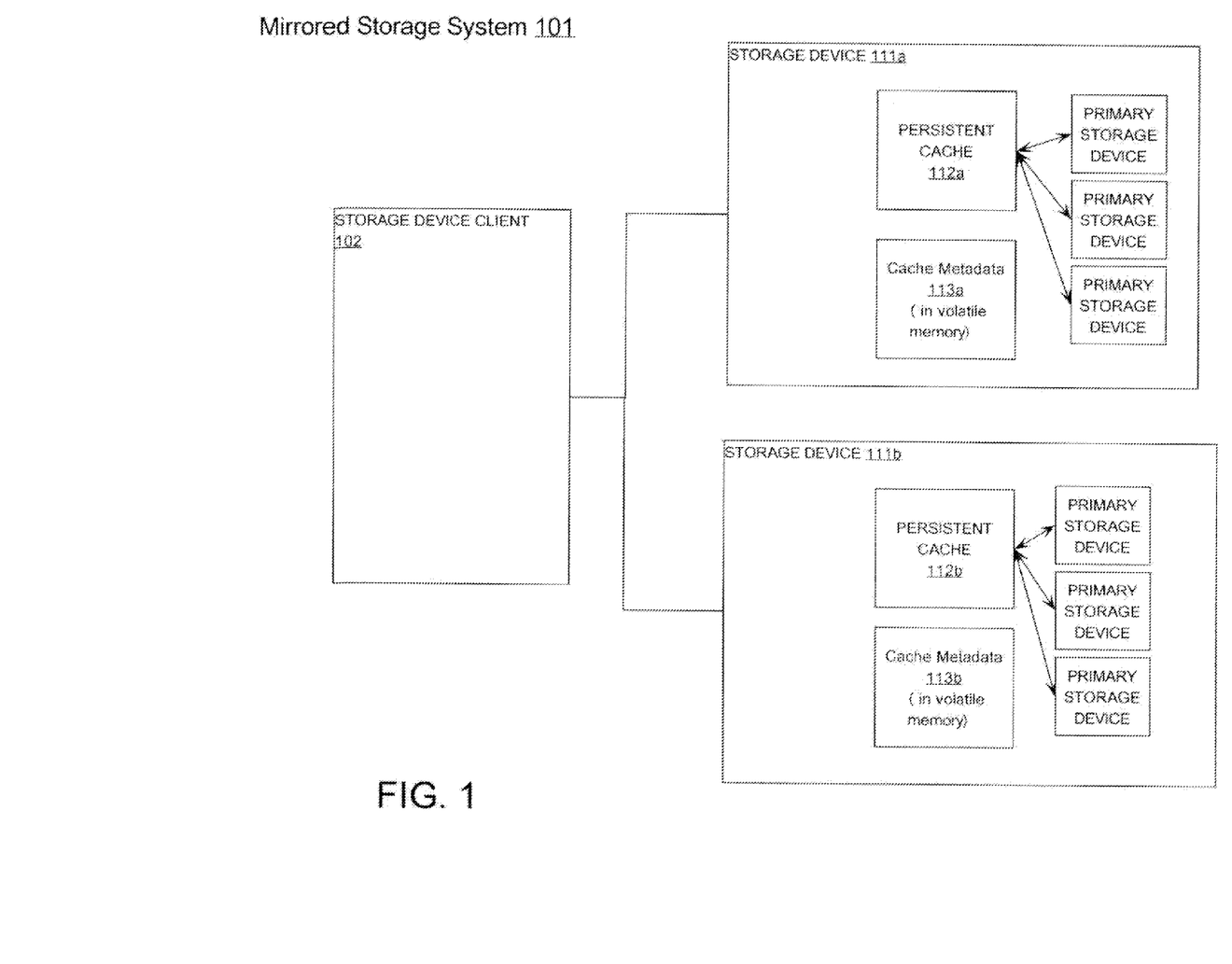
FIG. 1 is a drawing depicting a mirrored storage system according to an embodiment of the present invention.

Referring to FIG. 1, it depicts mirrored storage system 101 comprising multiple storage devices 111a and 111b (collectively storage devices 111) and a client of the storage devices, storage device client 102. An example of a storage device client is a database server, including a multi-node database server with each node running an instance of a database server and having shared access to storage device 111a and 111b. It should be noted that an embodiment of the present invention is not limited to database servers as storage device clients, or to any number storage device clients.

Data stored by storage device client 102 on storage devices 111a is mirrored on storage device 111b. Storage devices on which data is mirrored are referred to herein as minor buddies. Only two storage devices are depicted as mirror buddies within mirrored storage system 101 for purposes of exposition, however, an embodiment of the present invention is not so limited.

Storage device 111a comprises primary storage (not labeled) and persistent cache 112a, which is a cache for the primary storage. Persistent cache 112a may comprise one or more non-volatile memory devices, which are a faster form of a memory device than the primary storage devices used for primary storage.

In an embodiment, a non-volatile memory device is a flash memory device and the respective primary storage device is a disk-based device. However, this is merely one example of the types of memory devices that may be used to implement a storage device in an embodiment. A persistent cache device may be a smaller higher-speed magnetic disk drive connected to a larger lower-speed magnetic disk device as primary storage device. A persistent cache device may be a smaller higher-speed flash memory device connected to a larger lower-speed flash memory device as primary storage device.

According to an embodiment, storage device 111a is a computer system complete with one or more CPUs and volatile memory. The CPU, pursuant execution of software, manages operation of storage device 111a.

Storage device 111a is a block mode device. A block mode device provides a client access to data in units referred to as a data block. A data block is the atomic unit of data from primary storage that a storage device client may request from a storage device.

Data in a primary storage device in storage device 111a is organized by data blocks. A data block is associated with a data block address which uniquely identifies the data block and the data block's storage location within a storage device. A data block's "primary block address" is an address that identifies a storage location of the data block within primary storage in storage device 111a. A storage device client may request a data block by primary block address, or even by primary block address ranges of data blocks.

Copies of data blocks from a primary storage are stored in a persistent cache 112a. A copy of a data block in a primary storage that is stored in a data block of a persistent cache 112a is referred to herein as a cache copy or a cached data block. At any given moment of operation, the number of cached copies in persistent cache 112a is far less than the number of data blocks in the respective persistent cache devices.

When a storage device client requests a block mode storage device to write a data block, the client receives a commit acknowledgement acknowledging that the data block has been committed, that is, has been written persistently. Thus, when the data block is next requested by a client, the data block returned should have the version for which a commit acknowledgement was most recently sent.

In write-back mode, storage device 111a writes the data block requested by a client to a persistent cache device and acknowledges the commit of the data block before the data block may be written to the respective primary storage. The cache copy may then later be written to primary storage.

When storage device client 102 requests a data block from storage device 111a, it is possible that storage device 111a cannot return the data block for a variety of reasons, including a malfunction on storage device 111a. In this case, storage device 111a may issue an error message in response to the request for a data block from the storage device client 102. Upon receipt of the error message, storage device client 102a sends a request to the minor buddy of the storage device 111a, storage device 111b. Issuing another request for a data block to a minor buddy of a storage device in response to detecting that the data block cannot be returned from the storage device is referred to herein as minor redirection.

According to an embodiment, storage device 111b is structured and configured similarly to storage device 111a. Thus storage device 111b comprises persistent cache 112b, cache metadata 113b, and primary storage, which are used similarly as described for storage device 111a. In another embodiment, storage device 111b may be structured differently. For example, storage device 111b may not include a persistent cache. An embodiment of the present invention is not limited to storage systems comprised of homogenously structured and/or configured storage devices.

Cache Metadata

It is important to track that a cache copy is dirty and to accurately track what data block a cache copy is a copy of. For this function, storage device 111a stores and manages cache metadata 113a. Cache metadata 113a maps cache copies to data blocks in a primary storage and identifies which cache copies are dirty. A cache copy that has not been modified after being copied from primary storage remains the same as the primary storage version and is thus referred to as being clean. For any particular cache copy, cache metadata 113a includes a dirty flag that indicates whether or not a cache copy is clean or dirty. Cache metadata 113b serves a similar function on storage device 111b.

Cache metadata 113a is stored in volatile memory of storage device 111a. According to an embodiment, a persistent copy of cache metadata 113a is stored in persistent cache 112a, as described in Write-Back Storage Cache Based On Fast Persistent Memory. Cache metadata 113a and the persistent copy are kept in synch. In the event of a hardware-induced or software-induced crash, cache metadata 113a can be reconstructed by reading from persistent cache 112a.

Illustrative Rapid Re-Silvering

Figure 2:
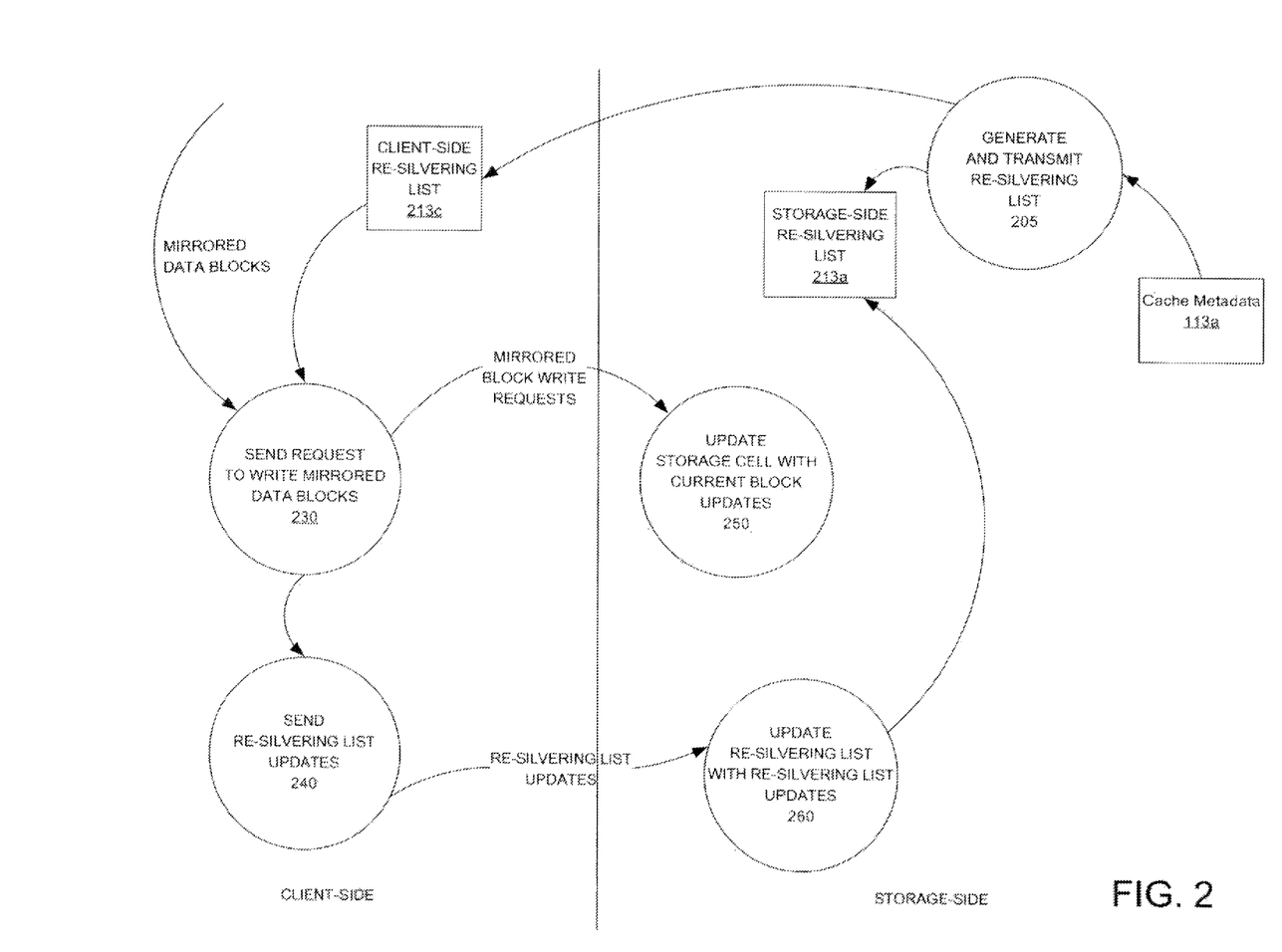
FIG. 2 is a drawing depicting operations performed for rapid re-silvering of a storage device according to an embodiment of the present invention.

As mentioned previously, the persistent cache may fail, necessitating re-silvering to make stale blocks current or otherwise valid. FIG. 2 shows operations performed for rapid re-silvering according to an embodiment of the present invention. The operations are performed in response to detecting a persistent cache failure of a storage device and are illustrated using mirrored storage system 101.

Referring to FIG. 2, in response to storage device 111a detecting a failure of persistent cache 112a, at 205 storage device 111a generates storage-side re-silvering list 213a. Storage-side re-silvering list 213a lists the data blocks that are dirty within persistent cache 112a as reflected in cache metadata 113a when storage-side re-silvering list 213a is generated. To generate storage-side re-silvering list 213a, storage device 111a examines cache metadata 113a, ascertaining which cache data blocks are dirty. In this way, storage device 111a determines and records the subset of data blocks which are to be "re-synchronized" by re-silvering. Once generated, storage device 111a transmits storage-side re-silvering list 213a to storage device client 102, which stores at storage device client 102 a copy of storage-side re-silvering list 213a, which is client-side re-silvering list 213c. The subset of data blocks in re-silvering list 213a is referred to herein as the re-silvering set.

Re-synchronization of a data block in re-silvering list 213a may entail retrieving the mirrored copy of the data block from storage device 111b (the minor buddy of storage device 111a) and writing the mirrored copy to storage device 111a. At 230, storage device client 102 sends write requests to write retrieved mirrored data blocks to storage device 111a, which at 250 writes the mirrored data blocks to primary storage and/or persistent cache 112a, thereby replacing a stale version of a data block with an up-to-date version.

To track the mirrored data blocks that have been re-synchronized on storage device 111a, storage device client 102 updates client-side re-silvering list 213c to reflect which data blocks in client-side re-silvering list 213c are re-synchronized on storage device 111a. To update storage-side re-silvering list 213a, at 240, storage device client 102 transmits re-silvering list updates to storage device 111a, the updates identifying which data blocks are to be deemed as re-synchronized. At 260, storage device 111a receives the re-silvering list updates and updates storage-side re-silvering list 213a to reflect which data blocks have been re-synchronized.

Re-synchronization

Write persistence is the characteristic of a data item (e.g. data block) where, once a request to write a version of the data block has been acknowledged as committed by a storage device servicing the request, the same version of the data item is returned by the storage device for any subsequent read requests from a storage device client, until the data item is overwritten by another write request acknowledged as committed by the storage device. The up-to-date version of a data block is the version that must be returned to satisfy write persistence.

When re-silvering a re-silvering set, a storage device client may not expect or need (for proper operation) write persistence for all data blocks in the re-silvering set. For the data blocks in the re-silvering set for which write persistence is to be maintained, re-synchronization entails recovering the up-to-date version, that is, entails getting the up-to-date version from a minor buddy and overwriting the data block on the storage device with the up-to-date version. For data blocks for which write persistence is not needed, recovering the up-to-date version is not needed to deem these data blocks re-synchronized.

According to an embodiment, a storage device client maintains information needed to ascertain the data blocks for which write persistence is to be maintained and data block recovery is required. A feature of the rapid re-silvering procedure depicted in FIG. 2 is that storage device client 102 drives the updating of the re-silvering lists, e.g. client-side re-silvering list 213c and storage-side re-silvering list 213a. The data blocks that do not require write persistence to be deemed re-synchronized may be marked in client-side re-silvering list 213c and storage-side re-silvering list 213a as having been resynchronized without having to recover the up-to-date version of the data block.

For example, storage device client 102 may be a database server that determines to drop a database object. In response, the set of data blocks that were storing database data for the database object are no longer designated by the database server for storing data for the database object. There is no need to retain write persistence and recover the up-to-date version of the data blocks. The data blocks in effect became synchronized when the database server no longer designated the data blocks as storing data for database data. Client-side re-silvering list 213c and storage-side re-silvering list 213a are updated to reflect the set of data blocks as having been resynchronized without having recovered the up-to-date version of the data block.

Another example is a storage configuration change of a storage device, in which the storage capacity is increased or reduced. To ensure even placement of data on each storage device, a set of data blocks that need to be re-silvered may have been automatically repaired due to data relocation to a new storage device. Client-side re-silvering list 213c and storage-side re-silvering list 213a are updated to reflect the set of data blocks as having been resynchronized without having recovered the up-to-date version of the data block during re-silvering.

Other Re-silvering List Details

In an embodiment, a re-silvering list identifies data blocks at a level of granularity higher than an individual data block. For example, a re-silvering list may identify regions of primary storage that cover a contiguous set and/or range of data blocks. Thus, a single dirty block in a region can lead to the re-silvering list marking that region for re-synchronization, even though only a single dirty block is stale.

In an embodiment, the re-silvering list is a bit map. Each bit identifies a data block or region of data blocks.

In an embodiment, after initially generating re-silvering list 213a, storage device 111a persistently stores a copy of storage-side re-silvering list 213a. Storage device 111a may re-boot or otherwise re-initializes to leave itself in a better or fully operational state for participating in the re-silvering. Storage-side re-silvering list 213a is thus available when storage device 111a comes back up.

While re-silvering storage device 111a, the storage device may go down, thereby halting the process of re-silvering. In an embodiment, storage-side re-silvering list 213a is check pointed by storing the re-silvering list persistently, thereby preserving the tracked progress of re-silvering. When the storage device 111a comes back up, storage device 111a may resume re-silvering at the point corresponding to where storage-side re-silvering list 213a was last check pointed.

In an embodiment, only portions of client-side re-silvering list 213c are sent at 205 for storage by storage device client 102 in its volatile memory. As the re-silvering list is updated to reflect re-synchronization of the set of blocks identified in the portion, re-silvering list updates for that portion are sent to storage device 111 to update storage-side re-silvering list 213a accordingly. Storage device 102 discards that portion and receives another portion of client-side re-silvering list 213c to store and process.

Availability of Clean Data Blocks During Re-silvering

When non-volatile memory fails, only a subset of data blocks in persistent storage are stale and should not be provided to a storage device client until re-synchronized. However, many other data blocks on primary storage are not stale and are up-to-date versions of data blocks. Optionally, in an embodiment, these up-to-date versions may be made available to a storage device client before completing or even starting rapid re-silvering. The storage side re-silvering list is used to ascertain whether a requested data block is up-to-date and may be returned to a storage device client when requested.

Figure 3:
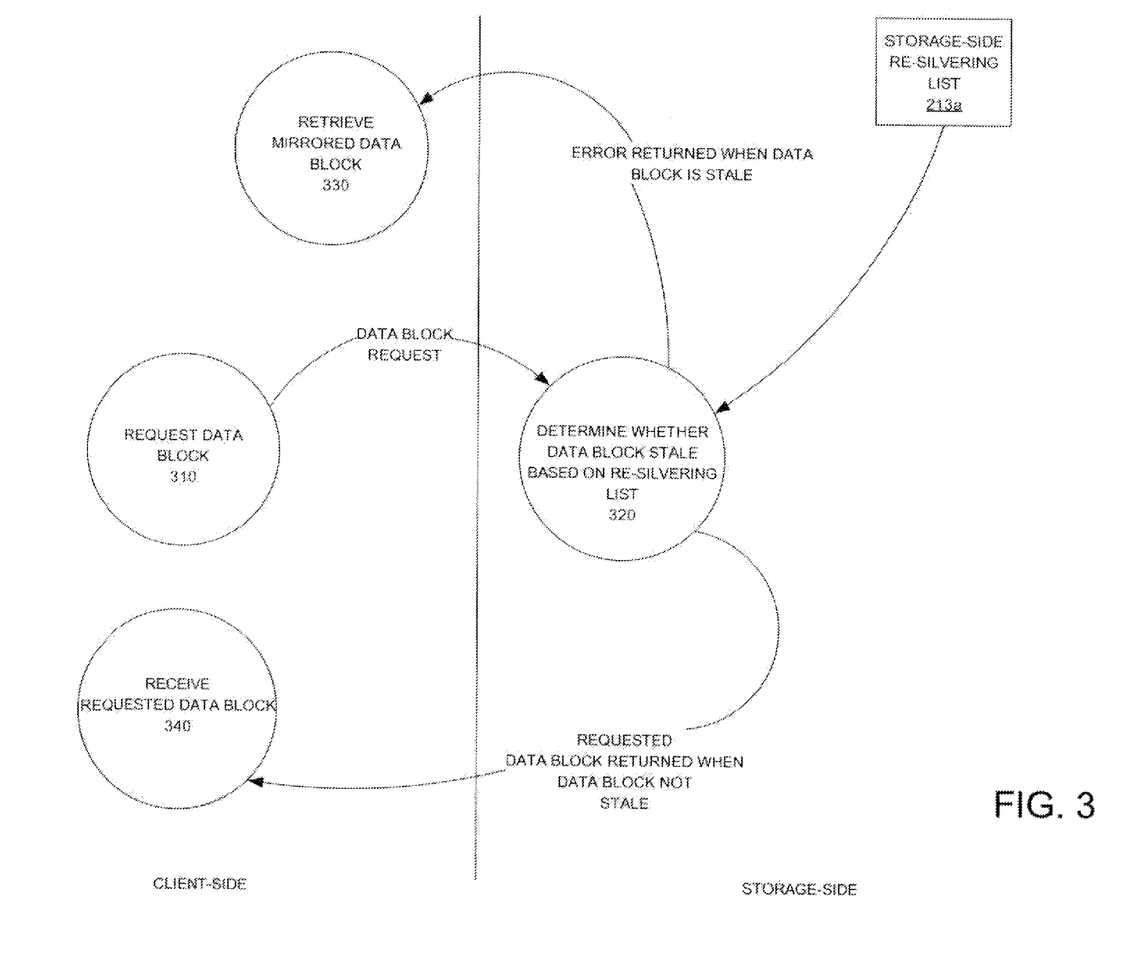
FIG. 3 depicts operations performed for making data available during re-silvering according to an embodiment of the present invention.

FIG. 3 depicts operations for making up-to-date data blocks available before completing re-silvering. The operations are performed with respect to mirrored storage system 101.

Referring to FIG. 3, at 310 storage device client 102 transmits a data block request to storage device 111a. The request may be for one or more data blocks. However, for purposes of exposition, the request is treated herein as a request for a single data block.

At 320, after receiving the data block request, storage device 111*a* determines whether the data block requested is stale or up-to-date. To make this determination, storage device 111*a* examines storage-side re-silvering list 213*a*. If storage-side re-silvering list 213*a* identifies a requested data block as stale, then storage device 111*a* sends an error message to storage device client 102 specifying that storage device 111*a* cannot provide an up-to-date data block. At 330, after receiving the data block, storage device client 102 retrieves the requested data block from mirror buddy storage device 111*b*.

If on the other hand, storage-side re-silvering list 213*a* identifies a requested data block as not stale or otherwise up-to-date, then storage device 111 sends the requested data block to storage device client 102*b*. At 340 storage device client 102 receives the requested data block.

Availability of Smart Scan Data Blocks

In an embodiment, storage devices may be capable of servicing a data block request for a "smart scan." In a smart scan, a database server requests from a storage device rows from a table that have been filtered according to a condition specified by the database server. For example, a database server is processing a query of a table, the query specifying a filter predicate condition that must be satisfied by the rows to return for the query. The database server may request, from a storage device, table rows from a data block range that are filtered according to the condition, the condition being supplied by the database server in conjunction with the request. In response to the request, the database server returns one or more "smart scan" data blocks containing rows satisfying the condition. The smart scan data blocks are not images of data blocks stored in primary storage. Rather, the smart scan data blocks are generated by the storage device to return filtered rows stored in data blocks in primary storage. A single smart scan data block may hold rows from multiple data blocks in primary storage.

During re-silvering, stale data blocks may be the subject of a smart scan. Such smart scans should not be available. When at 310, the database server transmits a data block request to storage device 111*a* for a smart scan of a range of data blocks, at 320, the storage device determines whether any data block in the range is stale or up-to-date. If any data block in the range is stale, the storage device 111*a* sends an error message, thereby causing a mirror re-direction of the smart scan to a minor buddy.

Alternative Implementations

In the foregoing specification, embodiments of the invention have been described with reference to numerous specific details that may vary from implementation to implementation.

For example, embodiments have been illustrated using a mirrored storage system with two storage devices, where one is the mirror buddy of another. However, in an embodiment of the present invention, a mirrored storage system may have more than two storage devices and a storage device may have more than one mirror buddy. For example, a storage device may have multiple mirror buddies. A first portion of primary storage (e.g. a disk device or region of the disk) may be mirrored on a first minor buddy while a second portion of the primary storage may be mirrored on a second mirror buddy.

Mirror redirections for data blocks in the first portion are redirected to the first mirror buddy, while minor redirections for data blocks in the second portion are redirected to the second minor buddy. Similarly, during re-silvering, data blocks in the first portion are re-synchronized using the first mirror buddy, and data blocks in the second portion are re-synchronized using the second mirror buddy.

The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
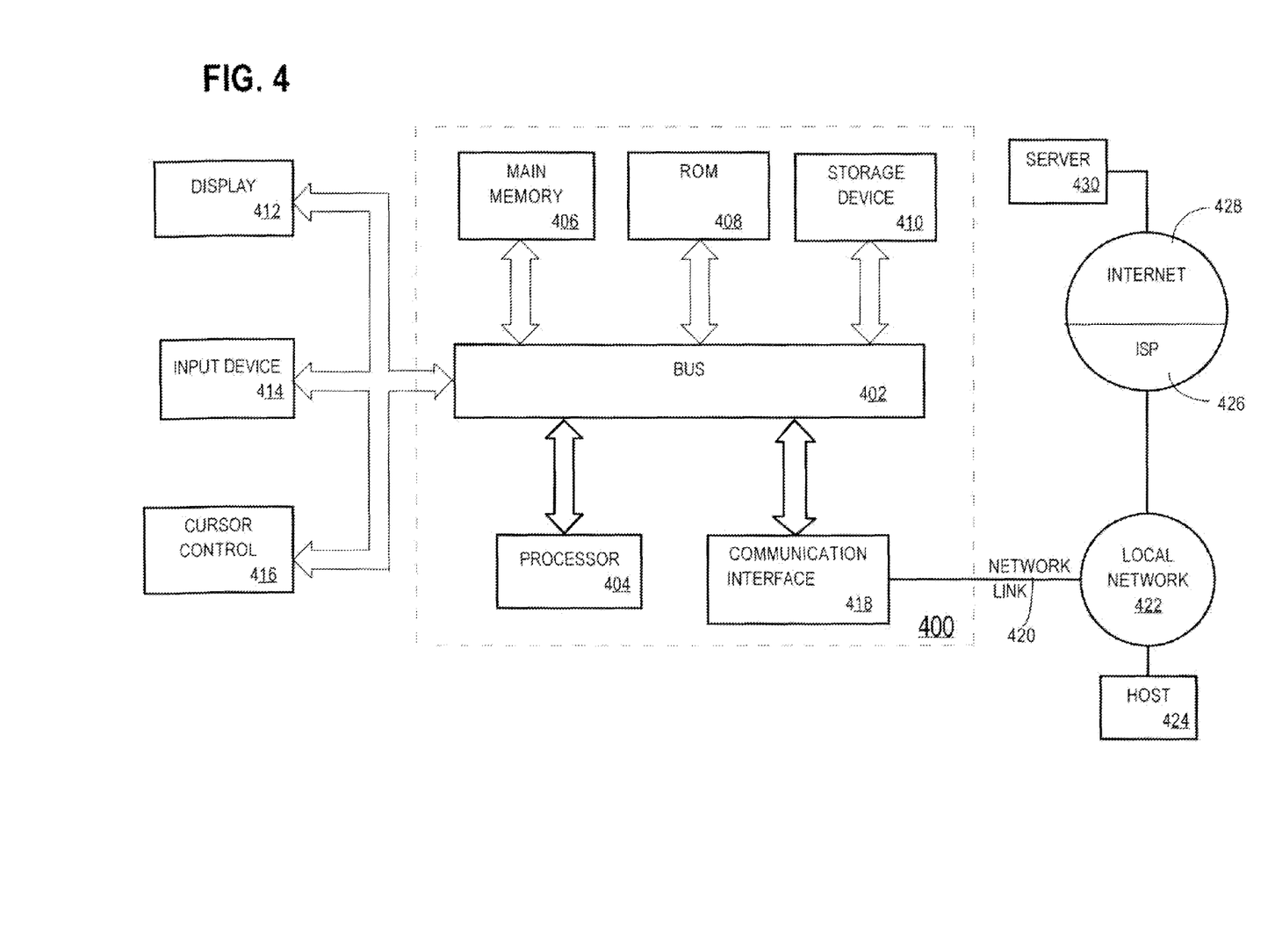
FIG. 4 is a computer system that may be used to implement an embodiment of the present invention.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising steps of:
a storage device detecting a failure of a storage device cache that said storage device uses to cache data stored in a primary storage of said storage device;
in response to detecting a failure:
said storage device making a determination of a set of data blocks in primary storage that are stale;
based on the determination of the set of data blocks in primary storage that are stale, said storage device generating a re-silvering list that identifies data blocks in said primary storage to re-synchronize; and
based on the re-silvering list, performing re-silvering of the storage device, wherein re-silvering comprises re-synchronizing data blocks identified by the re-silvering list by at least overwriting a subset of said data blocks with up-to-date versions of said subset of said data blocks from another storage device.

2. The method of claim 1, the steps further including:
while re-silvering the storage device:
the storage device receiving a request for a data block from a storage device client; and
in response to said request, the storage device returning said data block to said storage device client.

3. The method of claim 1, wherein the steps further include:
while re-silvering the storage device:
the storage device receiving a request for a data block from a storage device client;

in response to receiving the request for a data block, the storage device determining that the re-silvering list does not identify the data block as stale; and in response to determining that the re-silvering list does not identify the data block as stale, said storage device returning said data block to said storage device client.

4. The method of claim 1, further including the steps of:

maintaining in a volatile memory of said storage device, cache metadata that identifies data blocks in said cache that are dirty;

wherein the determination of a set of data blocks in primary storage that are stale is based on the cache metadata.

5. The method of claim 1, wherein the steps further include:

the storage device sending said re-silvering list to a storage device client of said storage device; and receiving from said storage device client write requests to overwrite particular data blocks in said re-silvering list with up-to-date versions of said particular data blocks from one or more mirror buddies of said storage device.

6. The method of claim 5, further including receiving from said storage device client updates to the re-silvering list, wherein receiving from said storage device client updates to the re-silvering list includes receiving an update that indicates that a certain data block has been synchronized, wherein a request to overwrite said certain data block to re-synchronize said certain data block has not been received by said storage device before receiving said update.

7. The method of claim 1, the steps further including:

a storage device client receiving said re-silvering list from said storage device;

based on an examination of the re-silvering list, said storage device client requesting up-to-date versions of particular data blocks from one or more mirror buddies of said storage device;

issuing to said storage device write requests to overwrite the particular data blocks;

updating a copy of said re-silvering list to reflect completion of said write requests; and sending to said storage device said client updates to the re-silvering list that reflect completion of said write requests.

8. The method of claim 7, wherein sending to said storage device said client updates to the re-silvering list includes sending an update to the re-silvering list to identify a particular data block as synchronized without having sent a write request to overwrite said particular data block with an up-to-date version of said particular data block.

9. The method of claim 1, wherein a storage device client of said storage device is database server.

10. The method of claim 1, wherein said storage device cache is non-volatile memory.

11. A computer-readable non-transitory storage medium that stores instructions which, when executed by one or more processors, cause the one of more processors to perform:

a storage device detecting a failure of a storage device cache that said storage device uses to cache data stored in a primary storage of said storage device;

in response to detecting a failure:

said storage device making a determination of a set of data blocks in primary storage that are stale;

based on the determination of the set of data blocks in primary storage that are stale, said storage device generating a re-silvering list that identifies data blocks in said primary storage to re-synchronize; and based on the re-silvering list, performing re-silvering of the storage device, wherein re-silvering comprises re-synchronizing data blocks identified by the re-silvering list by at least overwriting a subset of said data blocks with up-to-date versions of said subset of said data blocks from another storage device.

12. The computer-readable non-transitory storage medium of claim 11, wherein the instructions, when executed by said one or more processors, further cause:

while re-silvering the storage device:

the storage device receiving a request for a data block from a storage device client; and in response to said request, the storage device returning said data block to said storage device client.

13. The computer-readable non-transitory storage medium of claim 11, wherein the instructions, when executed by said one or more processors, further cause:

while re-silvering the storage device:

the storage device receiving a request for a data block from a storage device client;

in response to receiving the request for a data block, the storage device determining that the re-silvering list does not identify the data block as stale; and in response to determining that the re-silvering list does not identify the data block as stale, said storage device returning said data block to said storage device client.

14. The computer-readable non-transitory storage medium of claim 11, wherein the instructions, when executed by said one or more processors, further cause:

maintaining in a volatile memory of said storage device cache metadata that identifies data blocks in said cache that are dirty;

wherein the determination of a set of data blocks in primary storage that are stale is based on the cache metadata.

15. The computer-readable non-transitory storage medium of claim 11, wherein the instructions, when executed by said one or more processors, further cause:

while re-silvering the storage device:

the storage device sending said re-silvering list to a storage device client of said storage device; and receiving from said storage device client write request to overwrite particular data blocks in said re-silvering list with up-to-date versions of said particular data blocks from one or more mirror buddies of said storage device.

16. The computer-readable non-transitory storage medium of claim 15, wherein the instructions, when executed by said one or more processors, further cause receiving from said storage device client updates to the re-silvering list, wherein receiving from said storage device client updates to the re-silvering list includes receiving an update that indicates that a certain data block has been synchronized, wherein a request to overwrite said certain data block to re-synchronize said certain data block has not been received by said storage device before receiving said update.

17. The computer-readable non-transitory storage medium of claim 11, wherein the instructions, when executed by said one or more processors, further cause:

a storage device client receiving said re-silvering list from said storage device;

based on an examination of the re-silvering list, said storage device client requesting up-to-date versions of particular data blocks from one or more mirror buddies of said storage device;

issuing to said storage device write requests to overwrite the particular data blocks;

updating a copy of said re-silvering list to reflect completion of said write requests; and sending to said storage device said client updates to the re-silvering list that reflect completion of said write requests.

18. The computer-readable non-transitory storage medium of claim 17, wherein sending to said storage device said client updates to the re-silvering list includes sending an update to the re-silvering list to identify a particular data block as synchronized without having sent a write request to overwrite said particular data block with an up-to-date version of said particular data block.

19. The computer-readable non-transitory storage medium of claim 11, wherein a storage device client of said storage device is database server.

20. The computer-readable non-transitory storage medium of claim 11, wherein said storage device cache is non-volatile memory.

* * * * *